Dec. 6, 1966  B. G. WILLIS  3,289,718
ROUTER
Filed March 23, 1964  3 Sheets-Sheet 1
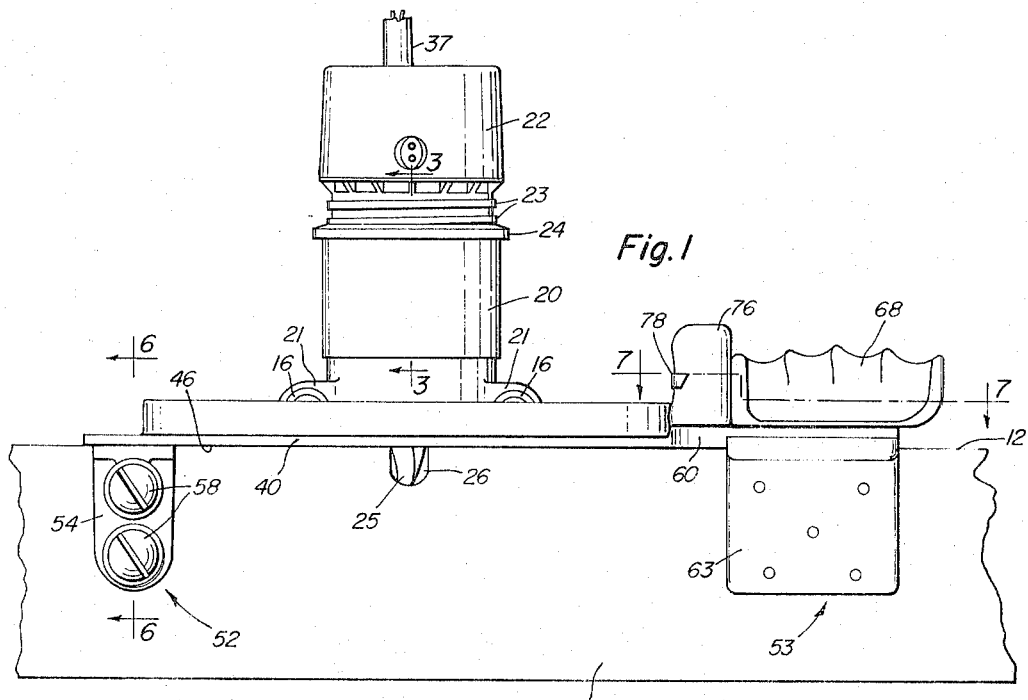
Fig.1
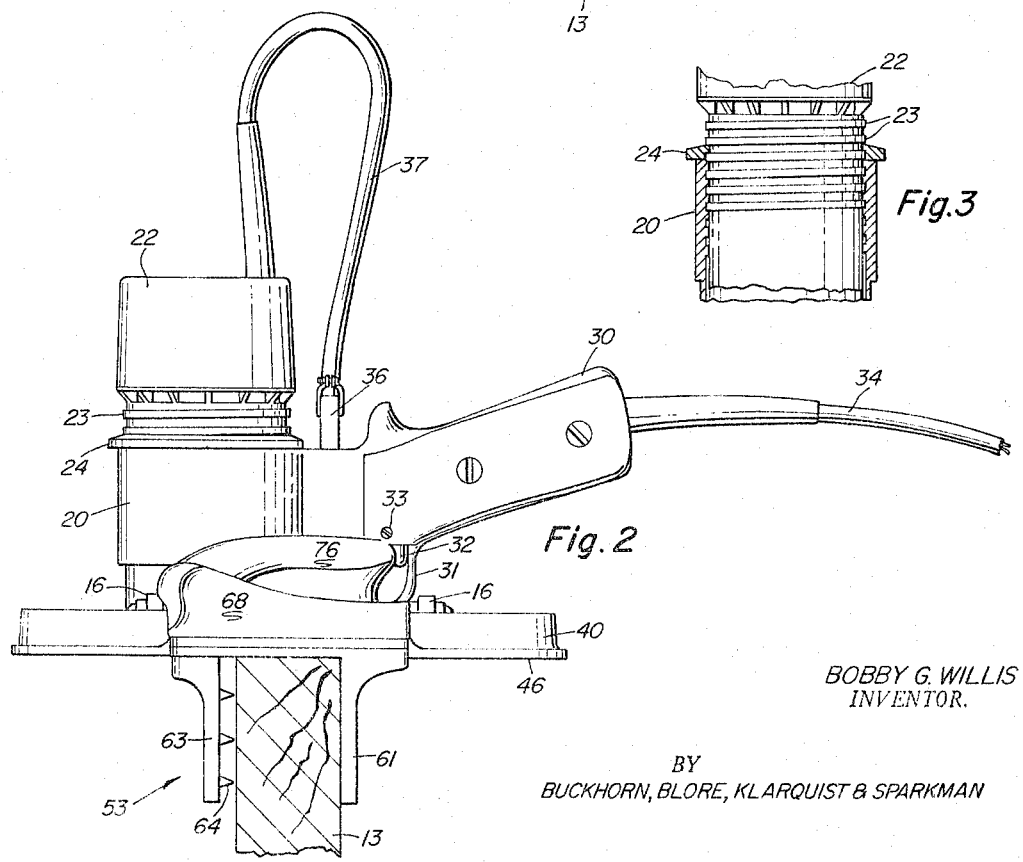
Fig.2
Fig.3
BOBBY G. WILLIS
INVENTOR.
BY
BUCKHORN, BLORE, KLARQUIST & SPARKMAN

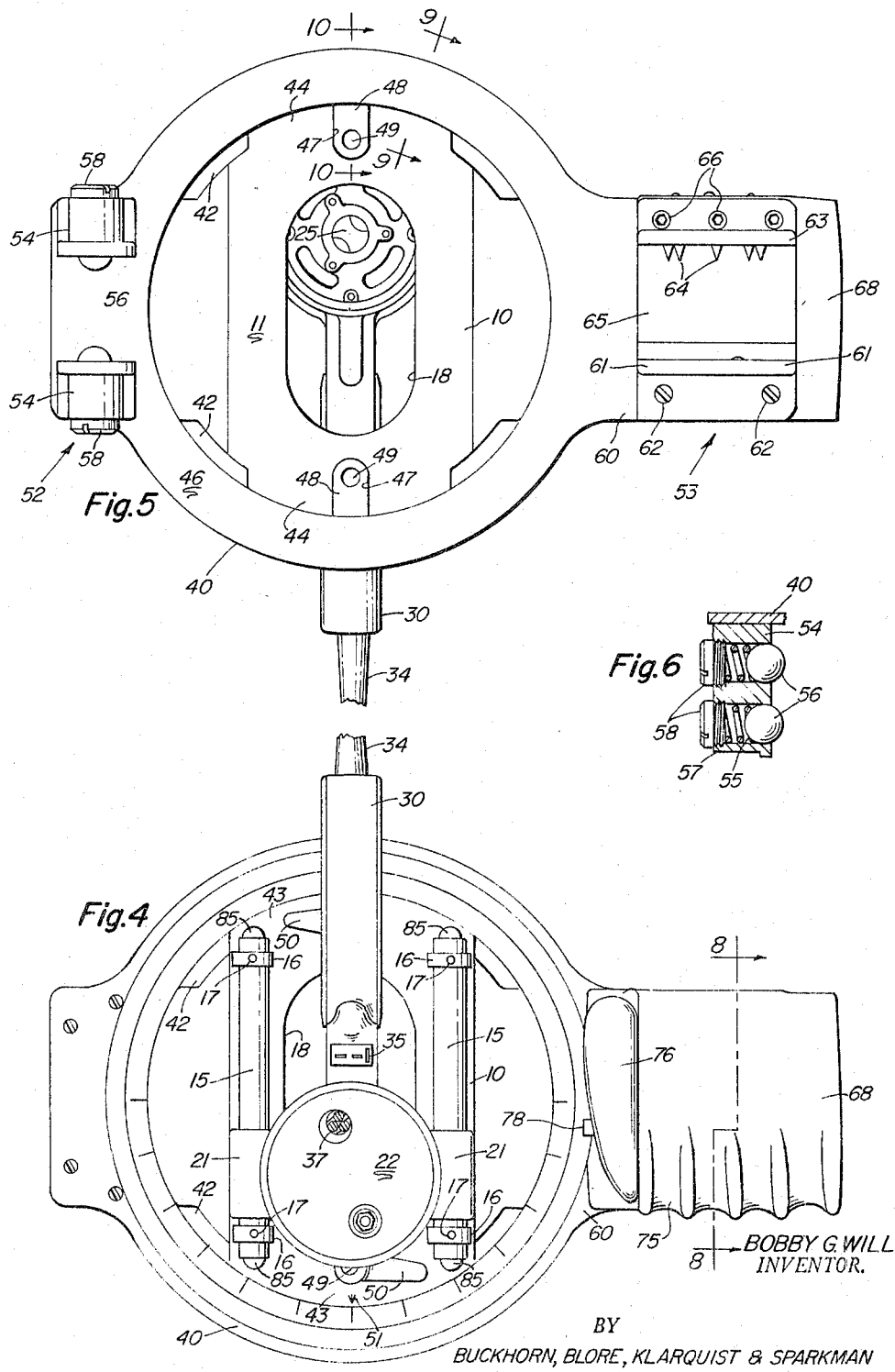

Dec. 6, 1966        B. G. WILLIS        3,289,718
ROUTER
Filed March 23, 1964        3 Sheets-Sheet 3
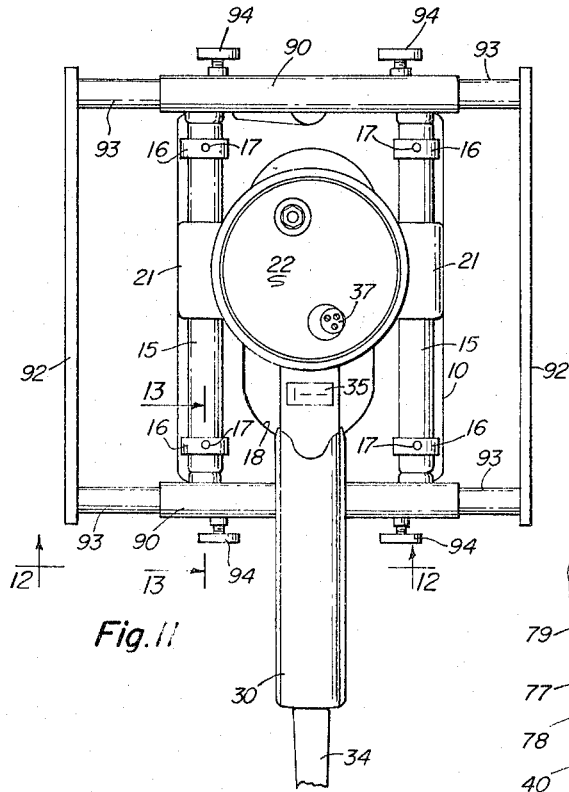
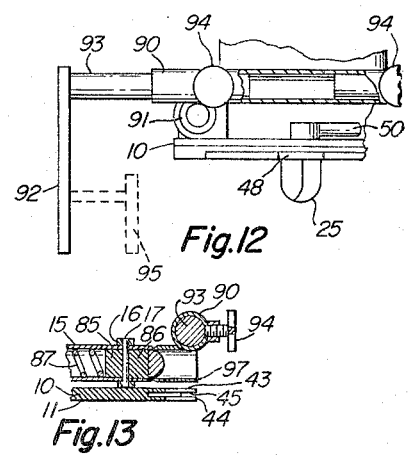
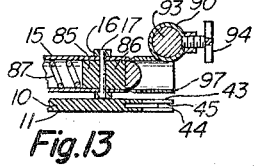
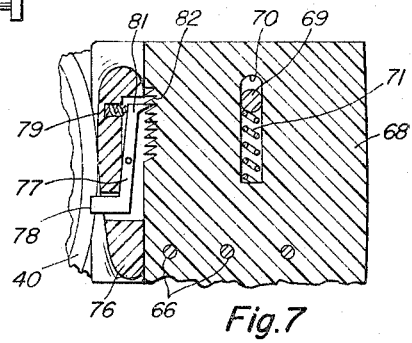
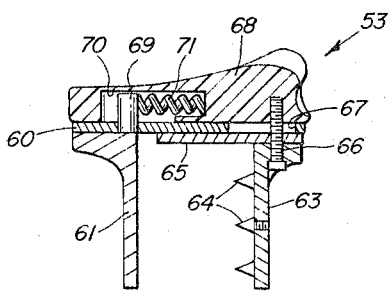
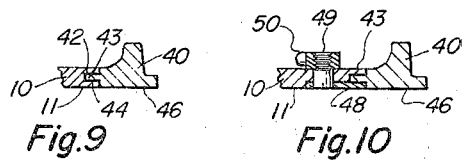
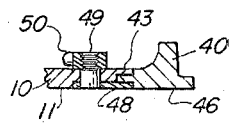
BOBBY G. WILLIS
INVENTOR.
BY
BUCKHORN, BLORE, KLARQUIST & SPARKMAN United States Patent Office 3,289,718
Patented Dec. 6, 1966

3,289,718
ROUTER
Bobby G. Willis, 2560 Alder St., Eugene, Oreg.
Filed Mar. 23, 1964, Ser. No. 353,917
5 Claims. (Cl. 144—136)

The present invention comprises a router particularly adapted to rout grooves in the surfaces of beams, joists, studs, rafters and other beam-like timber members of structures for the reception of intermediate sections of electric cables or conduits, water pipes, or similar members.

The principal object of the present invention is to facilitate the routing of such grooves by providing a router which may be rapidly positioned upon the member to be routed and which comprises a routing tool which may be rapidly guided across the surface of the member in any relative angular direction with respect thereto.

A further object of the present invention is to provide means of the foregoing character which may be easily manipulated and utilized in awkward positions, even on the lower surfaces of rafters.

A further object of the present invention is to provide routing means of the character described which may be adjustably set to rout grooves of the required depth, thus eliminating the danger of weakening structural members as has been encountered in prior practices involving boring, sawing, chiseling and chopping grooves in structural members.

The objects and advantages of the present invention will be more readily ascertained from inspection of the following specification taken in connection with the accompanying drawings and in which like numerals refer to like parts throughout.

In the drawings,

FIG. 1 is a front elevation of the present invention in position of use upon a structural member;

FIG. 2 is a side elevation of the present invention in use upon a structural member;

FIG. 3 is a partial, vertical section taken substantially along line 3—3 of FIG. 1;

FIG. 4 is a plan view of the present invention;

FIG. 5 is a bottom view of the present invention;

FIG. 6 is a partial, vertical section taken substantially along line 6—6 of FIG. 1;

FIG. 7 is a partial, horizontal section taken substantially along line 7—7 of FIG. 1;

FIG. 8 is a partial, vertical section taken substantially along line 8—8 of FIG. 4;

FIG. 9 is a partial, vertical section taken substantially along line 9—9 of FIG. 5;

FIG. 10 is a partial, vertical section taken substantially along line 10—10 of FIG. 5;

FIG. 11 is a plan view showing an auxiliary guide frame mounted on the router in place of the ring disclosed in FIGS. 1 to 10 inclusive.

FIG. 12 is a partial, vertical section taken substantially along line 12—12 of FIG. 11; and FIG. 13 is a partial, vertical section taken substantially along line 13—13 of FIG. 11.

In FIGS. 1 to 10, inclusive, the present invention is disclosed as comprising a base 10 (FIGS. 4 and 5) having a planular, lower surface 11 of considerable area, the lower surface being adapted for engagement with a surface such as the surface 12 (FIG. 1) of a structural member 13 upon which the router is to operate. A pair of tubular guide members 15 (FIG. 4) are suitably mounted upon the base, such as by means of ears 16 integral with the base and embracing the guide members, there being pins 17 passing through the ears and guide members to lock the guide members in position. The guide members are in the form of cylindrical, elongated members mounted respectively on opposite sides of an elongated sight opening 18 through the base. The guide members are parallel to each other and parallel to the lower surface 11 of the base.

Motor mounting means comprising an internally threaded, cylindrical sleeve 20 (FIG. 1) are mounted upon the base by means of integral, horizontally disposed guide sleeves 21 which respectively encircle the guide members 15 between the mounting ears 16. The axis of the motor mounting sleeve is vertical with respect to the lower surface 11 and midway between the guide members 15. An electric motor 22 is mounted in the motor mounting means for vertical adjustment therein, the external surface of the motor housing being provided with screw threads 23 for threaded engagement in the mounting sleeve. A lock nut ring 24 is preferably provided to lock the motor in adjusted position with respect to the mount. A routing tool 25 is coaxially disposed in driven engagement with the motor 22, the tool extending through the sight opening 18 and below the surface 11 to an extent determined by the operator whereby grooves such as groove 26 may be routed across the surface 12 of the structural member, the depth of the groove being determined by the vertical adjustment of the motor in its mounting means.

In order to conduct power to the motor and to manipulate the motor, it is preferably provided with a pistol grip switch handle 30 provided with the usual switch actuator guard 31, switch actuator 32, and continuous operation locking pin 33. Current is conducted to the motor through a cable 34 which passes through the handle and which is connected to the motor through a switch controlled by actuator 32. The circuit then goes to a socket portion of a plug-in connector 35 in the top of the handle and in which is engaged a removable connector plug 36. A second cable 37 leads from the plug 36 to the motor 22. The plug and socket provide a separable connection between the handle and the motor which may be separated in order that the motor 22 may be revolved about its axis for vertical adjustment purposes. The pistol grip handle 30 extends from the motor mounting in a direction parallel to the guides 15 and provides means whereby the motor and routing tool may be moved linearly within the limits imposed by the guiding means.

In order to determine the angle at which the groove 26 traverses the beam member, the base 10 is mounted in a ring 40 in such manner that the base and ring may be angularly shifted with respect to each other. For this purpose the ring and base are provided with annular tongue and groove means, as follows: A diametrically opposed pair of annular tongues 42 (FIGS. 4 and 9) are provided on the inner surface of the ring 40. The base 10 is provided with a diametrically opposed pair of upper annular tongues 43 and a diametrically opposed pair of lower annular tongues 44 providing between them grooves 45 for reception of the tongues 42. The tongues 42 are spaced apart to provide diametrically opposed recesses of such angular extent that the tongues 44 may pass vertically between the tongues 42 when the base is in one position angularly relative to the ring. However, the tongues 43 are of greater width than the gaps between the tongues 42 so as to arrest vertical movement in one direction and hold the base on the ring in such position that manual rotation may be utilized to engage the base and ring. The foregoing provides interrupted, annular tongue and groove means for adjustably retaining the base on the ring. The ring is provided with a lower surface 46 which lies in substantially the plane of the lower surface 11 of the base whereby the two surfaces may rest upon the surface of a member to be routed.

In order to hold the base in a predetermined angular position with respect to the ring, the lower surface 11 is provided with a pair of diametrically opposed recesses 47 (FIG. 5) of the same depth as the tongues 44, in which are respectively mounted a pair of clamping members 48. Each clamping member is fixed to a vertically extending stud 49 which extends upward through a suitable opening in the base and threadedly engages a clamping lever nut 50 (FIG. 10). When the nuts 50 are tightened, the clamping members 48 are drawn against the lower surfaces of the tongues 42 to retain the angular relationship of the base and ring.

Preferably, the base is provided with an index pointer 51 (FIG. 4), and the ring is provided with indexing marks so that the angular position may be rapidly fixed in accordance with some structural requirement. When the index marker 51 is brought into opposition with either of the end index points, separation of the base and ring may be achieved.

Releasable clamping means are provided on the ring 40 whereby the router may be releasably retained upon a structural member, such clamping means comprising a friction clamp indicated generally at 52 and a positive clamp indicated generally at 53. These clamps project beneath the lower surface of the base 10 in the same direction as the routing tool and are disposed on diametrically opposite sides of the ring 40.

The friction clamp 52 comprises a pair of depending members 54 having inwardly facing, oppositely disposed surfaces spaced apart from each other an amount slightly greater than the thickness of a standard structural framing member such as a 2 x 4. Each member 54 is provided with a pair of recesses 55 having their inner ends tapered whereby friction balls 56 mounted therein may project less than half of their diameters. The balls are urged by springs 57 retained under compression by threaded plugs 58. Pressure exerted against the top of the ring 40 above the friction retaining means causes spreading of the balls 56 whereby the router can be forced downwardly flush against the surface of the member to be routed.

The positive clamp 53 is mounted upon an extension 60 of the ring 40, the lower surface of which is slightly elevated with respect to the surface 46 of the ring. Depending from the extension 60 is a plate 61 (FIGS. 5 and 8) adapted to engage one side surface of the member to be routed, the plate being held in position by a pair of screws 62. Opposed to the plate 61 is a plate 63, on the inner surface of which are a plurality of spikes 64, and angularly fixed to the plate 63 is a sliding plate 65 which slides beneath the extension 60 and rests upon the surface of the beam to be routed. A plurality of screws 66 pass through the sliding plate 65, through slots 67 in the extension 60 and into a handpiece 68 resting upon the extension. A guide pin 69 fixed to the plate 61 and the extension 60 projects into a slot 70 in the handpiece and a spring 71 mounted in slot 70 bears against the pin 69. The handpiece 68 is formed of molded plastic and is provided on its upper surface with surface depressions 75 (FIG. 4) for reception of the fingers of the hand. A raised ridge 76 fixed to extension 60 is formed to fit between the forefinger and thumb of the hand gripping the handpiece. Mounted in a groove in the ridge 76 is a dog lever 77 (FIG. 7) having a release leg 78 projecting through an opening and beyond the outer side of the ridge. The dog end of the dog lever is forced forwardly by a spring 79 which forces the dog 81 into engagement with a series of notches 82 in the adjacent side of handpiece 68. The arrangement is such that the thumb may be utilized to depress the release leg 78 and separate the dog 81 from the notches 82 whereupon the palm of the hand may slide the handpiece in a direction to separate the plate 63 from the plate 61. After the router is placed in position, gripping pressure may be applied to the handpiece to cause the points 64 to penetrate a side wall of the member to be routed, and the dog 81 will engage an appropriate notch 82 positively to clamp the router to the member. This construction is of particular importance in utilizing the router on overhead beams or rafters.

It will be appreciated from the foregoing that the ring is assembled with the base most of the time, since almost all of the routing required for wiring or piping a structure is done in structural members of a particular size, such as 2 x 4's. However, if a larger structural member is encountered, the base may be quickly separated from the ring and the router may be used by manually gripping the handle 30 and the motor 22, manually guiding the routing tool across the surface to be routed. However, it is sometimes desirable or necessary to rout a long groove longitudinally of a structural member and for this purpose additional guiding means are provided, as set forth in FIGS. 11, 12 and 13.

For this purpose the guide members 15 are short sections of tubes, in the opposite ends of which there are provided plungers 85 (FIG. 13), the tips of which project beyond the ends of the tubes to an extent permitted by the pins 17 engaging in longitudinal slots 86 in the plungers. Projection of the plungers is accomplished by means of springs 87 compressed between the inner ends of the two opposed plungers in each tube. When the base is removed from the ring 40, a separate guide frame may be mounted thereon, as seen in FIG. 11. The guide frame comprises an opposed pair of parallel tubes 90, to each of which there is affixed a pair of sleeves 91 projecting inwardly in opposed relation so that the plungers 85 may be received therein to retain the guide frame on the base. The guide frame is rectangular in outline and comprises an opposed pair of guide rails 92, each of which is provided with legs 93 telescoping into the ends of the tubes 90. The extent of separation of the guide rails 92 is determined by thumb nuts 94 which pass through the tubes 90 and engage the legs 93. The guide rails 92 are thereby held in substantially parallel relation with the guide members 15 and are adapted to engage the side surfaces of wide structural members. The guide rails 92 extend below the lower surface 11 of the base on opposite sides thereof and enable the routing tool to be guided longitudinally of the structural member. The guide rails 92 may be of any suitable configuration such as indicated in dash lines at 95 in FIG. 12 whereby the routing tool may be used to rout a groove longitudinally of a member narrower than the base 10.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A router comprising a base having a sight opening therethrough, said base having a planular, lower surface for engagement with a surface of a beam member to be routed, a pair of guide members mounted on said base, said guide members extending parallel to each other and to said lower surface and being located respectively on opposite sides of said sight opening, motor mounting means slideably guided on said guide members, a motor mounted on said motor mounting means, said motor and said motor mounting means comprising means for adjusting the position of said motor vertically with respect to said lower surface, a routing tool mounted on said motor in driven engagement therewith, said routing tool having its axis of rotation disposed vertically with respect to said lower surface, and said routing tool projecting through said sight opening and beyond said lower surface, a ring mounted on and surrounding said base, said base and said ring comprising annular tongue and groove means for permitting angular shifting of said ring with respect to said base about an axis disposed vertically with respect to said lower surface, and releasable clamping means mounted on said ring and projecting beyond said lower surface in the same direction as said routing tool, said annular tongue and groove means being interrupted whereby to permit separation of said mounting ring from said base in one relative angular position thereof.

2. A router comprising a base having a sight opening therethrough, said base having a planular, lower surface for engagement with a surface of a beam member to be routed, a pair of guide members mounted on said base, said guide members extending parallel to each other and to said lower surface and being located respectively on opposite sides of said sight opening, motor mounting means slideably guided on said guide members, a motor mounted on said motor mounting means, said motor and said motor mounting means comprising means for adjusting the position of said motor vertically with respect to said lower surface, a routing tool mounted on said motor in driven engagement therewith, said routing tool having its axis of rotation disposed vertically with respect to said lower surface, and said routing tool projecting through said sight opening and beyond said lower surface, and a ring mounted on said base, said base and said ring comprising annular tongue and groove means for permitting angular shifting of said ring with respect to said base about an axis disposed vertically with respect to said lower surface, said annular tongue and groove means being interrupted whereby to permit separation of said mounting ring from said base in one relative angular position thereof.

3. A router comprising a base having a sight opening therethrough, said base having a planular, lower surface for engagement with a surface of a beam member to be routed, a pair of guide members mounted on said base, said guide members extending parallel to each other and to said lower surface and being located respectively on opposite sides of said sight opening, motor mounting means slideably guided on said guide members, a motor mounted on said motor mounting means, said motor and said motor mounting means comprising means for adjusting the position of said motor vertically with respect to said lower surface, a routing tool mounted on said motor in driven engagement therewith, said routing tool having its axis of rotation disposed vertically with respect to said lower surface, and said routing tool projecting through said sight opening and beyond said lower surface, a ring mounted on said base, said base and said ring comprising annular tongue and groove means for permitting angular shifting of said ring with respect to said base about an axis disposed vertically with respect to said lower surface, and releasable clamping means mounted on said clamping ring and projecting beyond said lower surface in the same direction as said routing tool, said clamping means comprising a friction clamp adapted to embrace a beam member to be routed at one side of said routing tool and a positive clamp adapted to embrace the beam member at a diametrically opposite side of said routing tool.

4. In a router,
a base having an elongated opening therethrough,
a pair of guide members mounted on said base and extending parallel to each other and to said opening and being located respectively on opposite sides of said opening,
motor mounting means slidably guided on said guide members,
a motor mounted on said motor mounting means,
a routing tool mounted on said motor in driven engagement therewith,
said routing tool having its axis of rotation disposed vertically and said routing tool projecting through said opening,
a ring mounted on and surrounding said base,
said base and said ring comprising annular tongue and groove means for permitting angular shifting of said ring with respect to said base about an axis disposed vertically with respect to said lower surface,
and releasable clamping means mounted on said ring and projecting beyond said lower surface in the same direction as said routing tool,
said annular tongue and groove means being interrupted whereby to permit separation of said mounting ring from said base in one relative angular position thereof.

5. In a router,
a base having an elongated opening therethrough,
a pair of guide members mounted on said base and extending parallel to each other and to said opening and being located respectively on opposite sides of said opening,
motor mounting means slidably guided on said guide members,
a motor mounted on said motor mounting means,
a routing tool mounted on said motor in driven engagement therewith,
said routing tool having its axis of rotation disposed vertically and said routing tool projecting through said opening,
and a ring mounted on and surrounding said base,
said base and said ring comprising annular tongue and groove means for permitting angular shifting of said ring with respect to said base about an axis disposed vertically with respect to said lower surface,
said annular tongue and groove means being interrupted whereby to permit separation of said mounting ring from said base in one relative angular position thereof.

References Cited by the Examiner

UNITED STATES PATENTS

| | | |
|---|---|---|
| 877,894 | 1/1908 | Kelley. |
| 2,591,002 | 4/1952 | Pedron. |
| 2,943,654 | 7/1960 | Emmons. |

DONALD R. SCHRAN, *Primary Examiner.*